US006542796B1

United States Patent
Gibbs et al.

(10) Patent No.: US 6,542,796 B1
(45) Date of Patent: Apr. 1, 2003

(54) METHODS AND APPARATUS FOR INTEGRATING, ORGANIZING, AND ACCESSING FLIGHT PLANNING AND OTHER DATA ON MULTIFUNCTION COCKPIT DISPLAYS

(75) Inventors: Michael J. Gibbs, Phoenix, AZ (US); Debi Van Omen, Scottsdale, AZ (US); Michael B. Adams, Scottsdale, AZ (US); Karl L. Chase, Glendale, AZ (US); Daniel E. Lewis, Glendale, AZ (US); Daniel E. McCrobie, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/715,744

(22) Filed: Nov. 18, 2000

(51) Int. Cl.⁷ .............................. G06F 7/00; G06F 17/00
(52) U.S. Cl. ............................. 701/3; 701/14; 244/183
(58) Field of Search ............................... 701/3, 14, 28, 701/9, 11, 15, 16, 5, 66; 244/183, 185, 186, 180, 181; 340/945, 961, 963, 971, 990, 995

(56) References Cited

U.S. PATENT DOCUMENTS

| | | | | |
|---|---|---|---|---|
| 4,375,638 A | * | 3/1983 | O'Keefe et al. | 340/726 |
| 4,899,293 A | * | 2/1990 | Dawson et al. | 345/423 |
| 5,528,751 A | * | 6/1996 | Priem et al. | 395/164 |
| 5,883,586 A | * | 3/1999 | Tran et al. | 340/945 |
| 6,002,398 A | | 12/1999 | Wilson | |
| 6,011,542 A | | 1/2000 | Durrani | |
| 6,057,786 A | * | 5/2000 | Briffe et al. | 340/975 |
| 6,112,141 A | | 8/2000 | Briffe | |
| 6,163,743 A | * | 12/2000 | Bomans et al. | 701/3 |
| 6,236,912 B1 | * | 5/2001 | Bomans et al. | 701/3 |
| 6,240,341 B1 | * | 5/2001 | Snyder | 701/3 |

* cited by examiner

Primary Examiner—Gertrude Arthur

(57) ABSTRACT

A method and system for displaying a flight plan such that an entire flight plan is viewable through the use of scrolling devices is disclosed. The flight plan display may also include a method and system for collapsing and expanding a flight plan display, have provisions for the conspicuous marking of changes to a flight plan, the use of tabs to switch between various displays of data, and access to a navigation database that allows a user to view information about various navigational aids. The database may also the access to the information about the navigational aids to be prioritized based on proximity to the current position of the aircraft.

22 Claims, 8 Drawing Sheets

METHODS AND APPARATUS FOR INTEGRATING, ORGANIZING, AND ACCESSING FLIGHT PLANNING AND OTHER DATA ON MULTIFUNCTION COCKPIT DISPLAYS

STATEMENT REGARDING FEDERALLY SPONSORED RESEARCH OR DEVELOPMENT

The invention described herein was made in the performance of work under NASA Contract No. NAS1-20219, TASK 10 and is subject to the provisions of Section 305 of the National Aeronautics and Space Act of 1958 (42 U.S.C. § 2457).

BACKGROUND OF THE INVENTION

Technical Field

The present invention relates, generally, to aircraft cockpit displays and, more particularly, to methods for integrating, organizing, and accessing flight plan and other data on cockpit displays.

Background Information

Aircraft flight displays continue to advance in sophistication, achieving increasingly higher levels of information density and, consequently, presenting a greater amount of visual information to be perceived and understood by the operator. In many instances, it is important that visual displays provide a proper cognitive mapping between what the operator is trying to achieve and the information available to accomplish the task. As a result, such systems increasingly utilize human-factor design principles in order to build instrumentation and controls that work cooperatively with human operators.

One area in particular that has not profited in advances in graphical user interfaces is the field of aircraft flight management systems (FMS). Flight management systems perform a variety of tasks for an aircraft. For example, a pilot may be able to program the FMS with an entire flight plan, including a variety of course changes. The FMS is then able to interface with the autopilot systems of the aircraft and automatically direct the aircraft along the flight path, automatically programming each course change into the autopilot.

However, in current generation aircraft, flight plan entry, editing, and viewing continues to be performed using cumbersome techniques which have not changed significantly in the decade. As a result, flight crews frequently complain that current flight management systems (FMS) are non-intuitive, difficult to interpret, and require too much heads-down time. Indeed, due to the high cockpit workload involved, many flight crews abandon the FMS altogether for flight planning functions, choosing instead to fly the aircraft by manually programming the autopilot.

Thus, there is a desire for a system that will simplify the use of the FMS such that pilots will be more likely to use the FMS. Such a system should also simplify th e display of the FMS to further ease the process of using the FMS.

SUMMARY

The following summary of the invention is provided to facilitate an understanding of some of the innovative features unique to the present invention, an d is not intended to be a full description. A full appreciation of the various aspects of the invention can only be gained by taking the entire specification, claims, drawings, and abstract as a whole.

The present invention provides a method and system for displaying a flight plan such that an entire flight plan is viewable through the use of scrolling devices. The present invention also provides for a method and system for collapsing and expanding a flight plan display. The present invention also provides for the conspicuous marking of changes to a flight plan. The present invention may also provide for the use of tabs to switch between various displays of data. Furthermore, there may be more than one set of tabs within a display system. In addition, the present invention discloses a navigation database that allows a user to view information about various navigational aids. The database may also the access to the information about the navigational aids to be prioritized based on proximity to the current position of the aircraft.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The present invention is illustrated by way of example and not limitation in the accompanying figures, in which like reference numbers indicate similar elements, and in which.

DETAILED DESCRIPTION

Systems and methods in accordance with various aspects of the present invention provide an improved graphical user interface for the display and editing of aircraft flight-plan data. In this regard, the present invention may be described in terms of functional block components and various processing steps. It should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein.

Figure 11:
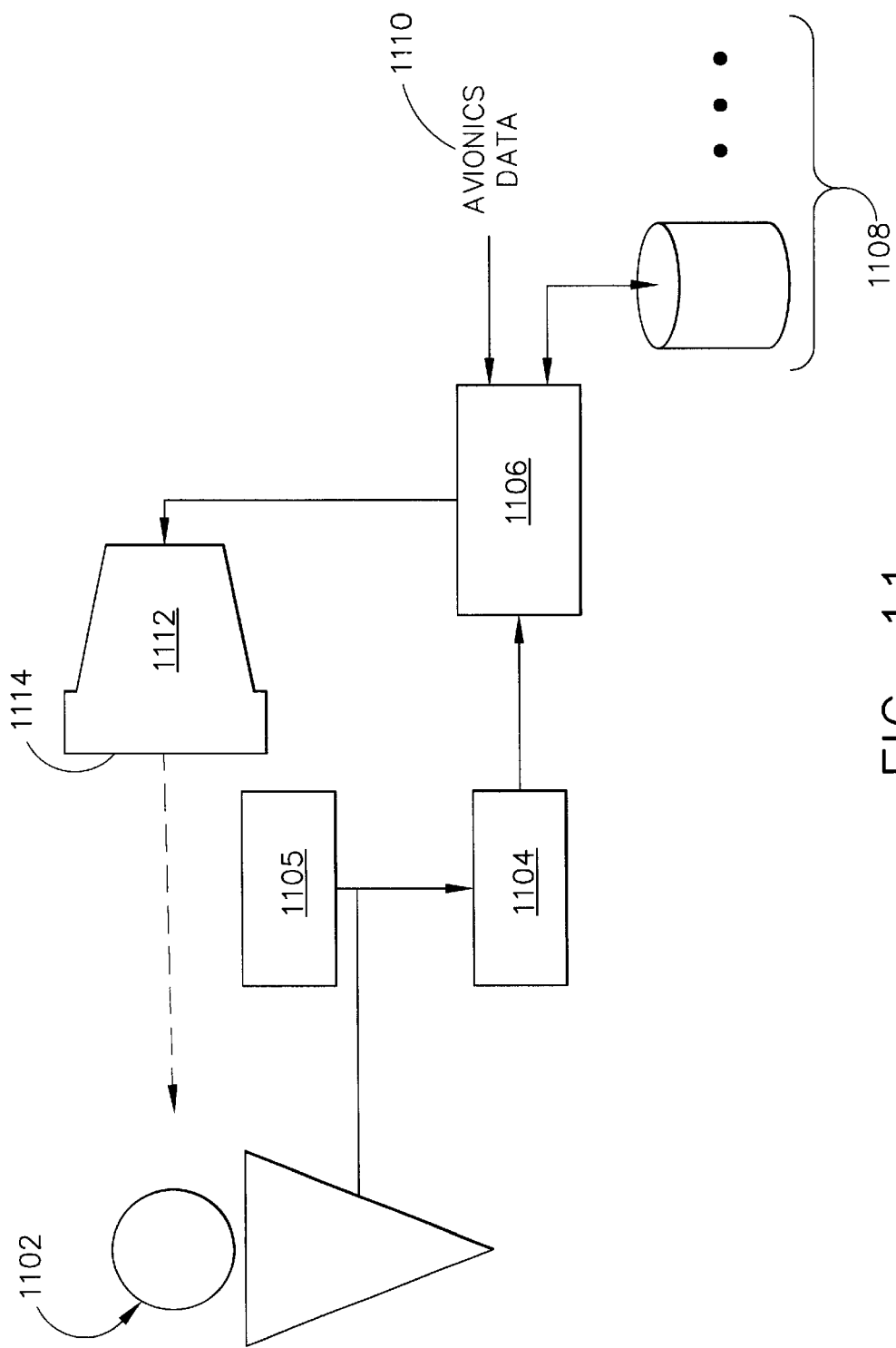
FIG. 11 is a schematic overview of a user interface in accordance with the present invention.

Briefly, referring to FIG. 11, a system in accordance with various aspects of the present invention includes a processor 1106 configured to communicate with an associated monitor (or multiple monitors) 1112, one or more data sources 1108, cursor control device 1104, text entry system 1105, and avionics data 1110. In general, a user 1102 (e.g., a pilot), located within the aircraft (not shown) provides input to processor 1106 through cursor control device 1104, and receives visual feedback via a display 1114 produced by monitor 1112. Through use of cursor control device 1104 and text entry system 1105, user 1102 may modify the flight-plan or other such indicia graphically in accordance with feedback provided by display 1114.

Cursor control device 1104 includes any device suitable to accept input from user 1102 and convert that input to a graphical position on display 1114. Various joysticks, mice, trackballs, and the like are suitable for this purpose. In one embodiment, cursor control device 1104 comprises a touch-pad interface device with a thumb actuation switch on the side. In this embodiment, the user rests his or her hand on a built-in palm-rest to stabilize the hand, position the fingertip for pointing, and position the thumb for clicking.

Text entry system 1105 includes any device suitable to accept text input from user 1102 and convert that input into data that is readable by processor 1106. Various keyboards, keypads, and the like are suitable for this purpose.

Monitor 1112 may include any display monitor suitable for displaying the various symbols and information detailed below. Many currently known monitors are suitable for this task, including various CRT and flat-panel display systems.

Processor 1106 encompasses one or more functional blocks used to provide flight management and control, interface with cursor control device 1104, and drive monitor 1112. In this regard, processor 1106 may include any number of individual microprocessor, memories, storage devices, interface cards, and other standard components known in the art.

Avionics data 1110 includes standard information related to the state of the aircraft. For example, sensors can be used to determine the current position of the aircraft, the heading of the aircraft, the speed of the aircraft, weather data, and various other information. Data source 1108 includes various types of data required by the system, for example, flight plan data, data related to airways, waypoints, navigational aids, symbol textures, navigational data, instructions, font textures, taxi registration, Special Use Airspace, political boundaries, communication frequencies, approach information, and the like.

Pilots typically fly an aircraft along a predetermined route that is described in a flight plan. When a flight plan between two locations (for example, between two airports) is developed, the plan will typically involve flying between various waypoints along various airways. Flying along an airway typically involves flying from one waypoint to another. Waypoints are specific locations that are defined by latitude and longitude. Airways are predetermined routes that join several waypoints together, similar to the manner in which an interstate highway connects several cities together.

Analogous to the manner in which Interstate route 10 (1–10) connects various cities in the United States from Los Angeles, Calif., through Phoenix, Ariz., all the way to Jacksonville, Fla., an airway labeled J44 connects waypoint PXR (at approximately 33° N latitude, 112° W longitude) with waypoint INR (at approximately 35° N latitude, 111° W longitude). Airways have particular headings and ranges between the waypoints being connected. For example, the above described J44 airway is 113 nautical miles long with a heading of 30°.

A typical flight plan may involve flying from an airport to a specific waypoint, then flying along an airway, possibly through several other waypoints while following the airway to the destination waypoint. After possibly flying along several airways through several waypoints, the aircraft enters the arrival stage, a transition from cruising along the airways. After the arrival stage is the approach stage, where the FMS and the pilot perform the final preparations for landing the aircraft.

Figure 1:
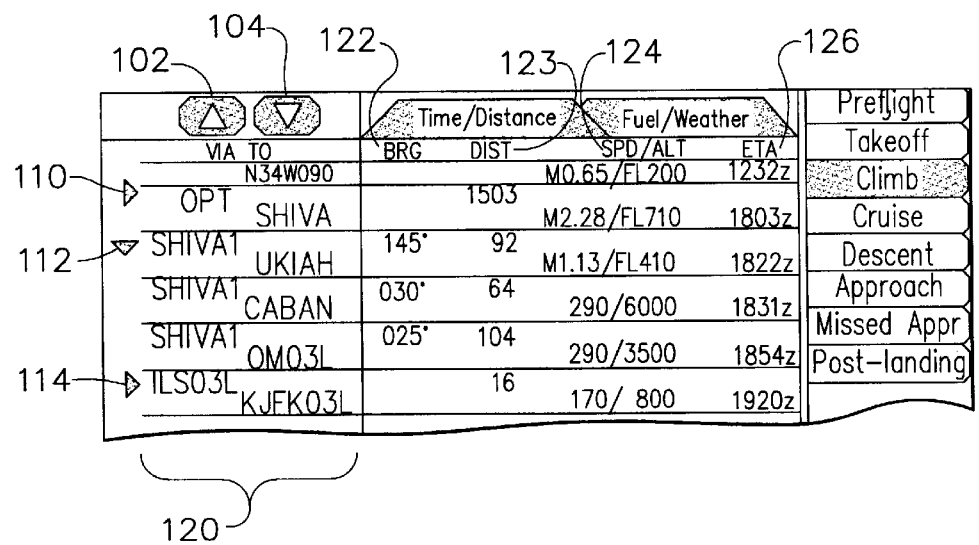
FIG. 1 illustrates an exemplary flight plan display in accordance with the present invention.

An FMS may be programmed with each of the waypoints and airways an aircraft is to fly. The flight plan portion of an exemplary FMS display is shown in FIG. 1. Column 120 shows the names of the waypoints and airways that are part of a flight plan; bearing column 122 shows the bearing to be flown on a particular portion of a flight plan; distance column 123 shows the distance to be flown in a particular portion of a flight plan; speed column 124 shows the programmed speed and altitude to be flown during a particular portion of a flight plan; and ETA column 126 shows the estimated time of arrival at a particular waypoint. The contents of the above described columns will be described in greater detail infra.

Once a flight plan is programmed into the FMS, the aircraft's auto-pilot function may be configured such that each leg of a flight plan is programmed into the auto-pilot at the correct moment. In other words, as the aircraft reaches each waypoint, the FMS re-programs the auto-pilot with the new heading, speed, altitude, and other necessary information.

A flight plan may contain many different waypoints for a particular flight. It is possible that the flight plan contains so many different waypoints that the list of waypoints is not entirely viewable in the FMS display. Therefore, the present invention incorporates the ability to scroll the flight plan data in the FMS display.

With reference to FIG. 1, an embodiment of the present invention includes scroll arrows 102 and 104 in the flight plan display. Specifically, scroll arrow 102 may be configured such that the use of scroll arrow 102 moves the flight plan display in one direction, while the use of scroll arrow 104 moves the flight plan display in the other direction. In FIG. 1, scroll arrow 102 is configured to move the flight plan display up one line such that flight plan data that is previous to the currently shown portion of the flight plan data is shown while scroll arrow 104 is configured to move the flight plan display down such that flight plan data subsequent to the currently shown portion of the flight plan data is shown. In the alternative, scroll arrows 102 and 104 may be configured such that instead of the display moving one line at a time, multiple lines are scrolled with each activation of a scroll arrow. Activation may occur by clicking on a scroll arrow by using cursor control device 1104 to position the cursor over the scroll arrow, then depressing a switch.

Also shown on FIG. 1 are arrows 110, 112, and 114. These arrows can be used to implement another feature that may be used to simplify the viewing of data on an FMS data screen.

An aircraft may be cleared or instructed (by an air traffic controller, for example) to fly directly from waypoint to another. In the alternative, the aircraft may be directed to fly along an airway between two different waypoints. Such an instruction is generally termed a procedure. (Although a procedure may also consist of an instruction to travel between two adjacent waypoints joined by an airway.) There may be a number of different intermediate waypoints between the stated waypoints that are not explicitly stated in a clearance; those intermediate points can be determined from a chart that includes the definition of the airway. In typical usage, such information is also contained in a database accessible by the FMS. The flight segments between the intermediate waypoints are commonly called the "legs" of a procedure. Thus, a pilot may be instructed to fly a procedure that includes one or more legs.

Figure 2A:
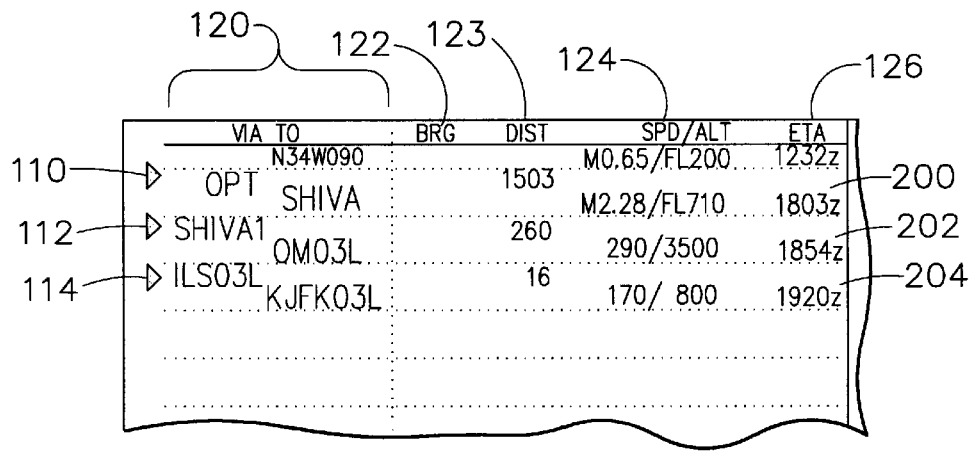
FIGS. 2A, 2B, and 2C illustrate the expanding and collapsing of an exemplary flight plan display.

For example, with reference to FIG. 2A, a flight plan may include a procedure from a waypoint labeled SHIVA to a waypoint labeled OM03L via a procedure called SHIVA1. All of this information is located in column 120. The left side of column 120 shows the airway to be used, while the right side of column 120 shows the destination waypoint. FIG. 2A indicates, at line 202, that the destination of OM03L is 260 nautical miles away and the estimated time of arrival is 1854z (Zulu time or Coordinated Universal Time (UTC); formerly known as Greenwich Mean Time; equivalent to 11:54 am Mountain Standard Time). Line 200 shows the information for the previous waypoint, labeled SHIVA and line 204 shows information for the next waypoint, labeled KJFK03L.

In order to conserve space on the FMS display, only waypoints SHIVA and OM03L are shown on the display. The fact that bearing column 122 is empty for line 202 indicates that there are multiple bearings along the procedure, thus no single bearing can be shown as linking the two waypoints. Thus, the legs of the procedure have been collapsed such that only a summary of the procedure as a whole is being displayed. It has been discovered that pilots that are operating an aircraft often wish to view all of the intermediate waypoints or legs within a procedure. In particular, the heading of the aircraft may change between waypoints and a pilot typically wants to know the heading the aircraft is supposed to be following, in order to monitor the performance of the aircraft, the FMS, and the auto-pilot systems.

Figure 2B:
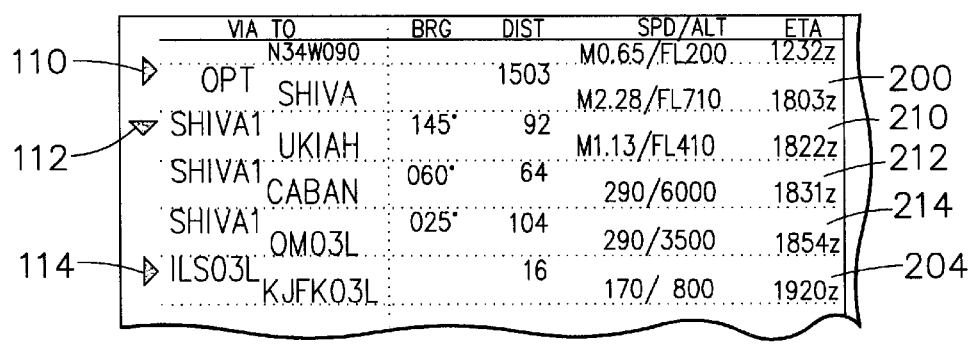

FIG. 2B shows the resulting display after the activation of button 112: the procedure from SHIVA to OM03L is expanded to show legs 210, 212, and 214. Button 112 points downward, indicating that the procedure has been expanded. In FIG. 2B, the waypoints named UKIAH and CABAN are explicitly displayed on the FMS display, along with the bearing and distance between the two waypoints and the speed and altitude to fly for each leg of the procedure. In other words, in order to fly from SHIVA to OM03L via procedure SHIVA1, the aircraft must first pass through UKIAH, then change direction to fly through CABAN before changing direction again and reaching OM03L.

Thus, the activation of arrow 112 enables the pilot to view each individual leg of a procedure. The pilot can thus choose between the display of a broad overview of a flight plan or viewing the details of each leg of a flight plan.

While arrows 110, 112, and 114 allow the pilot to manually select when to view each leg of a procedure, it may also be desirable for each leg to be visible when that particular leg is active, whether or not the procedure is expanded.

For example, as shown in FIG. 2A, one procedure of the exemplary flight plan involves traveling from SHIVA to OM03L along airway SHIVA1. As discussed above such a procedure contains several legs, specifically, legs from SHIVA to UKIAH; from UKIAH to CABAN; and from CABAN to OM03L.

The FMS display may be configured to highlight the path currently being traversed. That option is satisfactory for direct procedures (those consisting of only one leg), but a pilot may wish to view the particular leg the aircraft is travelling for the reasons listed above.

Figure 2C:
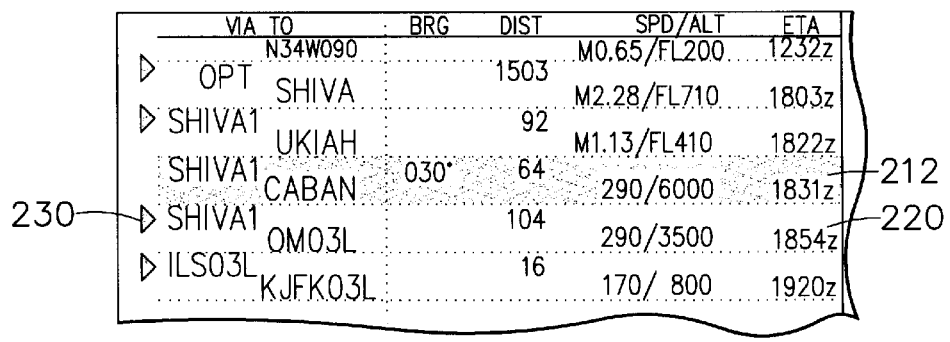

FIG. 2C shows one possible solution to that problem: showing a collapsed procedure with the details of the active leg being shown. As illustrated by line 212, which may also be highlighted to indicate its status, the aircraft is flying the procedure from SHIVA to OM03L, on the leg from UKIAH to CABAN. The aircraft should be flying at a heading of 030 degrees and will travel 64 miles until reaching CABAN and the pilots will be able to confirm whether or not the aircraft is following the intended direction. However, line 220 shows that the next leg of the procedure may have multiple waypoints. In order to display other legs in the procedure, the pilot would have to activate arrow 230.

Thus, FIG. 2C shows the layout of the display in the case that line 202 from FIG. 2A is not expanded: during flight, as a leg becomes active, the details of that leg are displayed.

At the time the aircraft completes the leg to CABAN, preferably, the FMS display will display the next leg of the flight, from CABAN to OM03L. The FMS display may list all previous legs of the procedure. In the alternative, each of the previous legs can be "rolled" into the previous legs, such that the display would list only the beginning waypoint of a procedure (SHIVA in FIG. 2C), and the waypoint that was just reached (CABAN in FIG. 2C). Therefore, the display would only show SHIVA and CABAN, with the full details of the leg from CABAN to OM03L optionally being fully detailed as well. Once the entire procedure has been flown, the individual legs of the procedure may all be rolled into the previous legs. It should be remembered that the display may be changed at any time by manually expanding or collapsing the procedure by activating an arrow, regardless of which leg is active. However, preferably, it will not be possible to collapse the current leg of a procedure as it may desirable for the full details of the current leg to be displayed at all times.

As discussed in the related application entitled, "Method and System For Entering Data Within A Flight Plan Entry Field," filed on Nov. 17, 2000 as Ser. No. 09/715,308, the contents of which are incorporated by reference, there are several methods available to input a flight plan and changes to a flight plan. Often, when inputting changes to a flight plan, the pilot may wish to view both the current flight plan and how the proposed flight plan would effect the current flight plan. By viewing the details of the proposed modification to the flight plan, the pilot is better able to determine if he wishes to finalize such a modification and also to confirm that the entered modification is appropriate.

As described in the above-referenced patent application, a pilot is able to enter new waypoints in a flight plan in several ways, including typing in the beginning and ending waypoints and the airway between the two waypoints to be followed in traveling from the beginning to the ending waypoint.

As shown in FIG. 1, the displayed flight plan data may include the bearing 122, distance 123, speed and altitude 124, and estimated time of arrival (ETA) 126 for each leg of a procedure. When entering in procedures and legs of a flight plan, flight plan highlighting enables the pilot to view the above data for a new procedure before approving the plan.

An exemplary situation showing the utility of flight plan highlighting involves a situation where a air traffic controller ("ATC") requests that an aircraft change its course, due to traffic, weather, or various other reasons. As discussed in the above application, the ATC may give the pilot a proposed procedure by suggesting beginning and ending waypoints and an airway. The pilot may then enter the proposed procedure, either in the manner described in the above application or in another manner that is known in the art or may become known. The system is configured to display the new procedure on the display, showing the resulting flight plan. The pilot may then enter in other new procedures and view the resulting plan to determine if the proposed change to the flight plan is acceptable. The changes may be unacceptable because the aircraft may lack the necessary fuel to carry out the change, because the change may undesirably change the arrival time of the flight, or for various other reasons.

The present invention preferably indicates the proposed changes to the flight plan on the display before the changes are finalized. Preferably, the proposed changes to the flight plan are displayed such that they stand out from existing flight plan in a conspicuous manner. The proposed changes can be highlighted in a color that is different from the color of the rest of the flight plan. In the alternative, the color of the font used for the changed legs may be changed, or a different typeface may be used. Methods for producing such a change on a display can be accomplished using many techniques that are known in the art. After viewing the proposed flight plan, the pilot would then be able to accept the changes or cancel the changes.

Figure 3:
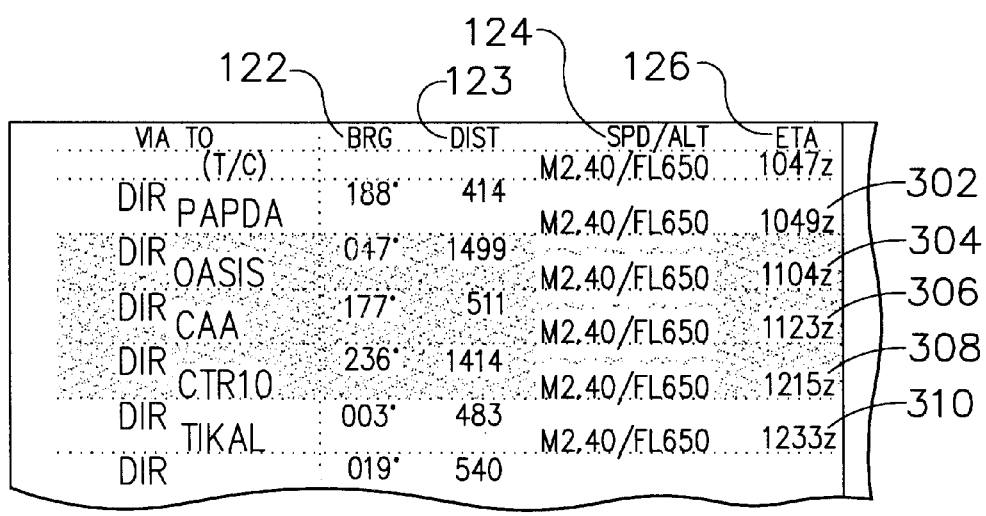
FIG. 3 shows the operation of flight plan highlighting on an exemplary flight plan display.

The operation of flight plan highlighting is shown in FIG. 3. Lines 302 and 310 are existing procedures on a particular flight plan. In the example of FIG. 3, the pilot entered in additions to the flight plan using various methods. Those additions are shown on lines 304, 306, and 308. In this example, the ATC may have inserted several waypoints into the flight plan to, for example, avoid rough weather in a certain area. It can be seen that lines 304, 306, and 308 have a different background color than do lines 302 and 310. Thus, a pilot is more easily able to determine which entries in a flight plan are the new entries. When a proposed flight plan is entered, each leg of the proposed change may be listed on the flight plan display. In the alternative, only the start and end of the procedure may be displayed.

Showing the proposed modifications in a conspicuous manner serves several purposes. For example, the pilot is able to confirm that the proposed changes to the flight plan that the pilot entered in the FMS is the same as the proposed flight plan requested by the ATC. Typically, when an ATC sets forth instructions to a pilot, the pilot repeats the instructions to ensure that what the pilot heard is actually what the ATC said. Thus, displaying all of the changed information on the display enables the pilot to more easily view the proposed changes and confirm the changes with the ATC. In addition, if the proposed changes to the flight plan are unacceptable for the various reasons listed above, the pilot may be able to request an alternate change to the flight plan.

Figure 4:
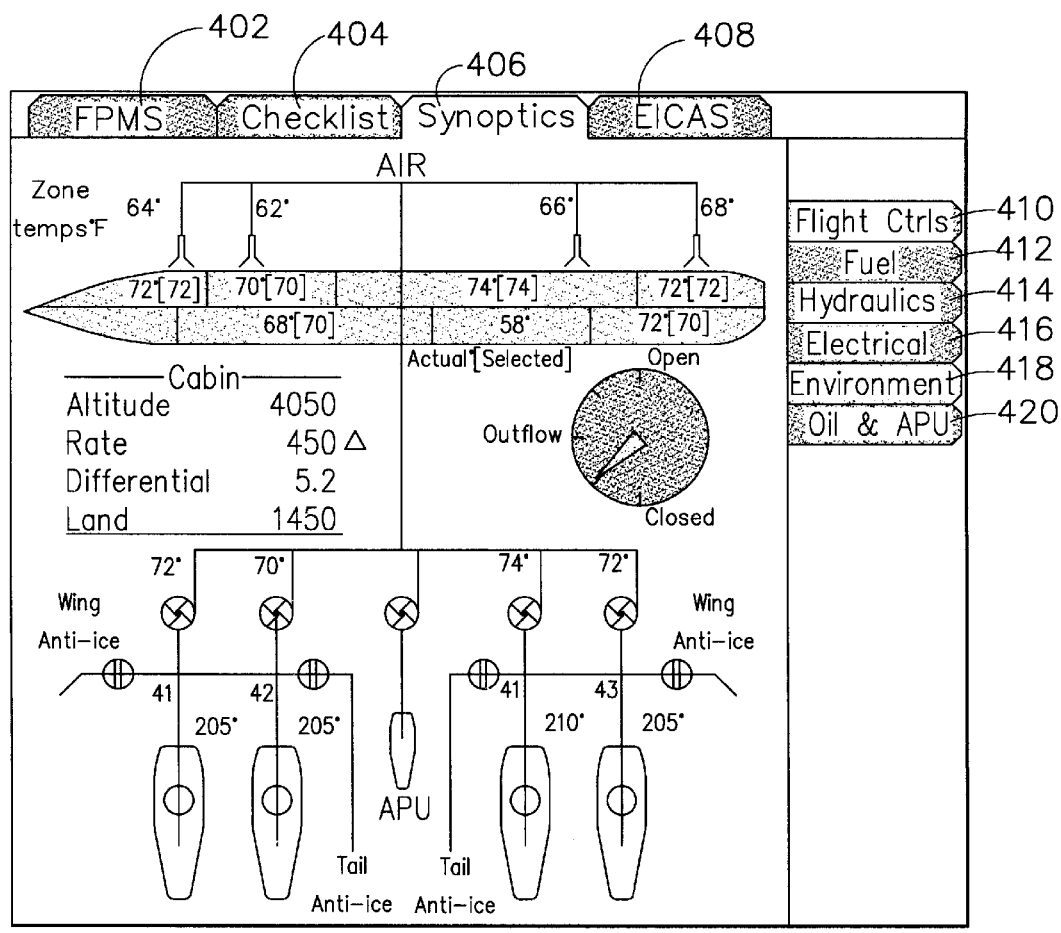
FIG. 4 illustrates a synoptic window within an FMS display.

The FMS display may also contain information about various different systems. The FMS compiles enough information such that it may be difficult to display all of the information on one page. For example, shown on FIG. 4 is environmental data for the aircraft as well as information concerning the anti-ice system. However, there are multiple systems on an aircraft for which information may be displayed. Although it may be possible to display all of the data on a single screen through the use of a small font or a larger screen, such a display may not be desirable for various readability reasons and space reasons. Therefore, function tabs have been developed to enable a readable FMS display while also enabling a pilot to switch between various screens.

FIG. 4 shows function tabs along the top of the display. Specifically, FPMS tab 402 selects the Flight Plan Management System, checklist tab 404 selects the checklist page, Synoptics tab 406 selects the synoptics display, and EICAS tab 408 selects the Engine Indication and Crew Alerting System ("EICAS") display. A pilot may select a function tab by placing the cursor on the desired function tab and indicating a selection by, for example, clicking an action button. FIG. 4 shows the flight management system, electronic checklist, system synoptics, and EICAS sharing a single display unit. In FIG. 4, Synoptics tab 406 is highlighted to indicate that the page containing system synoptics is active and being displayed. If the pilot wished to access the checklist, he would indicate so by placing the cursor, using a cursor control mechanism on checklist tab 406 "click" on the tab.

Function tabs may be useful when multiple, non-critical systems compete for a limited amount of display area. They are visually and functionally similar to tabs on file folders. The tabs not only provide a control that is used to select the desired system, but also provide a visual indication of which system is currently selected.

Data tabs 410, 412, 414, 416, 418, and 420 are also shown in FIG. 4. Data tabs can be used to select between different pages within a specific area. For example, FIG. 4 shows the synoptics page. Within the synoptics page, there are six different sub-pages available for display: Flight Controls, Fuel, Hydraulics, Electrical, and Oil & APU. By selecting the appropriate data tab, the pilot is able to select from among those sub-pages to display the desired information. If the pilot wished to view synoptic information regarding the fuel system, he would use the cursor control unit to click on data tab 412 to indicate his desire.

Figure 5:
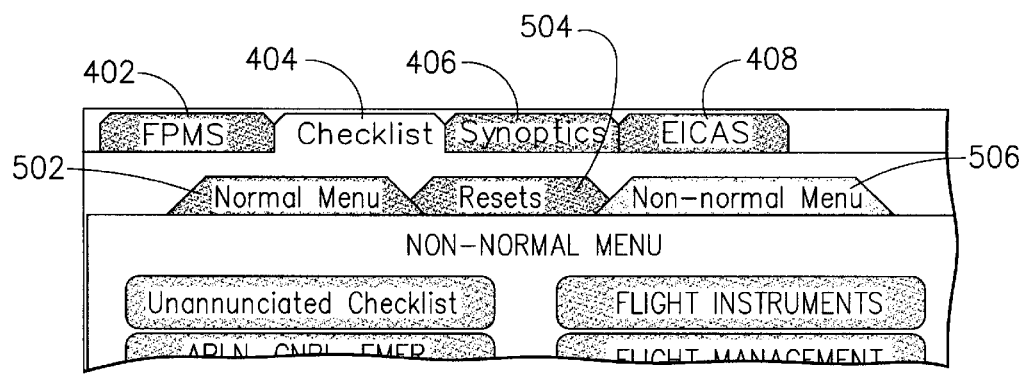
FIG. 5 illustrates a checklist window within an FMS display.

Data tabs are further shown in FIG. 5, which shows data tabs 502, 504, and 506 within the Checklist function tab. The checklists of the exemplary aircraft are divided into three groups, normal checklists, checklists for resets, and non-normal checklists, for ease of use. A pilot may be able to select an appropriate checklist to perform merely by clicking on the correct tab.

Figure 6:
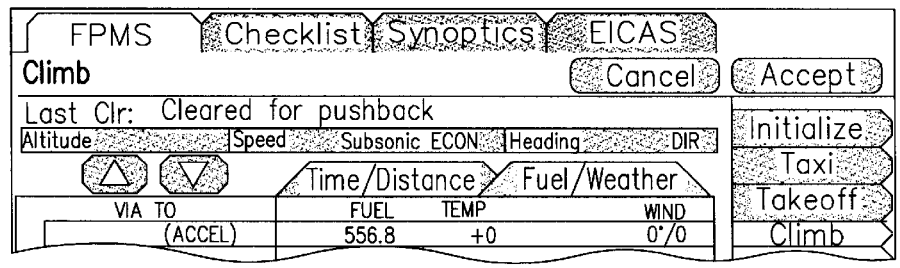
FIG. 6 illustrates a flight plan window within an FMS display.
Figure 7:
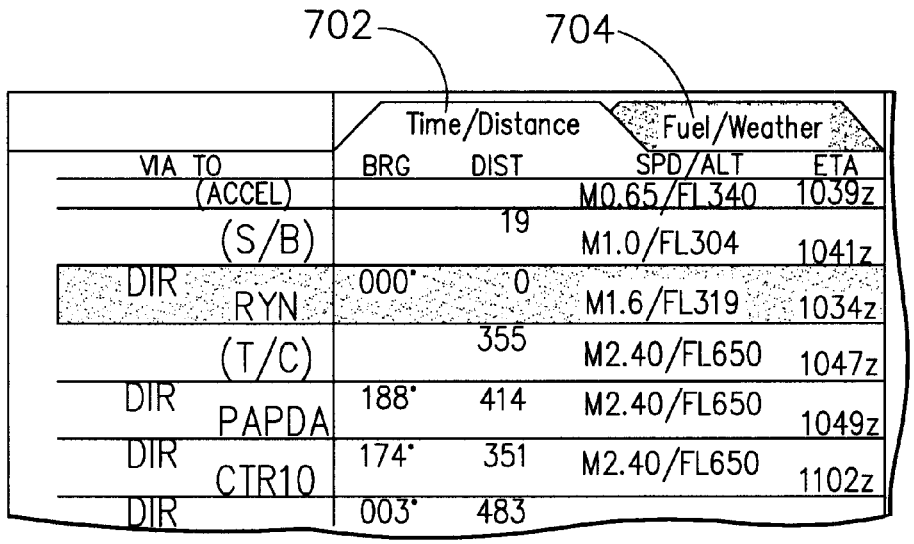
FIG. 7 further illustrates a flight plan window within an FMS display.
Figure 8:
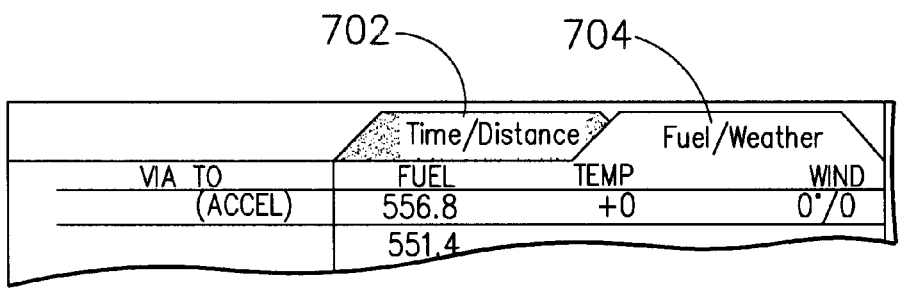
FIG. 8 shows the data viewable under a different data tab in a flight plan window within an FMS display.

FIGS. 6 and 7 shows another exemplary use of data tabs. In FIG. 6, it can be seen that the flight plan display is selected. In FIG. 7, one can see that data tab 702 allows a pilot to view what was previously shown in FIG. 1, various information regarding procedures in a flight plan. Data tab 704 allows the pilot to view more information regarding the fuel and weather for the procedures of a flight plan. For example, FIG. 8 shows the data shown by selecting data tab 704, including an estimate of how much fuel remains after each leg or procedure is completed and an indication of the weather, including the temperature and the wind, at each waypoint in a procedure or a leg.

Data tabs may also be configured such that, if a certain system requires attention from the pilot, the tab for that system is highlighted.

Data tabs may be useful when there is not enough display area to present all the available information and the information is not required to be displayed at all times. Data tabs group related information together and provide the means to switch among groups of data.

Figure 9:
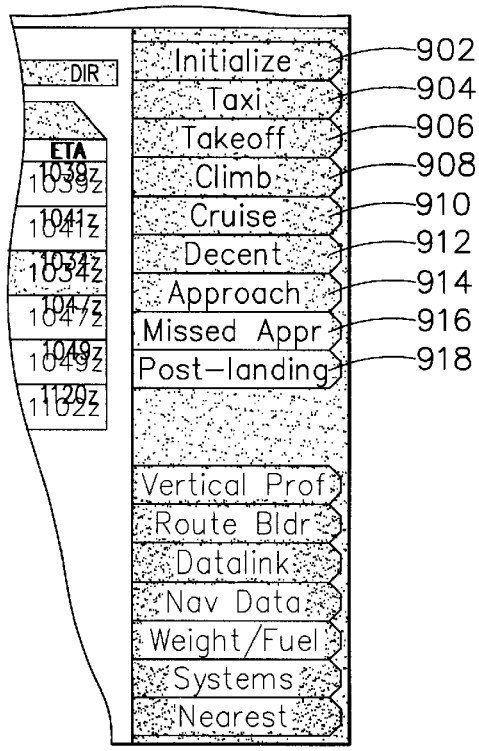
FIG. 9 shows an exemplary collection of flight tabs within a flight plan window of an FMS display.

FIG. 9 shows another form of Data tabs, termed the flight phase tabs. Flight phase tabs 902, 904, 906, 908, 910, 912, 914, 916, and 918 are present within the FPMS screens and enable the quick selection of the various phases of flight. It should be understood that the flight phases detailed in the FIG. 9 are only exemplary; various different listings of flight phases are possible. Since a normal flight progresses through flight phases in a pre-determined sequence and at well-defined times, the transition from one flight phase to another is automatic. For example, a typical flight will start with a taxi phase, followed by take-off, climb, cruise, descent, approach, and landing. The transition from cruise to descent, for example, occurs when the aircraft is lowered in altitude. Before landing occurs, the aircraft will also pass through the approach and arrival phases. As discussed above, the FMS display can automatically switch between the various procedures of a flight plan as those procedures become active.

By making flight phase tabs available, however, the crew can manually select a flight phase to review the information relevant to that portion of the flight. To review the approach procedures, for example, the crew can click on approach tab 914. In some instances, an aircraft may not land after the approach. For example, an ATC may request the aircraft complete a "go-around" procedure in which the pilot terminates the approach because of a crowded runway and request that the plane circle around the airport to try to land again. The FMS may be programmed with a path used for a go-around at the destination airport. Thus, if the ATC requests a go-around, the aircraft already has the flight plan for the go-around programmed into the FMS. The pilot is able to select missed approach tab 916 to view the programmed go-around.

Since each procedure and leg of the flight plan data itself is associated with a flight phase, selecting a tab may scroll the flight plan display to show the corresponding portion of the flight. Clicking on the Descent tab, for example, scrolls the flight plan such that the legs and procedures beginning with the top of descent point are indicated on the display.

Figure 10:
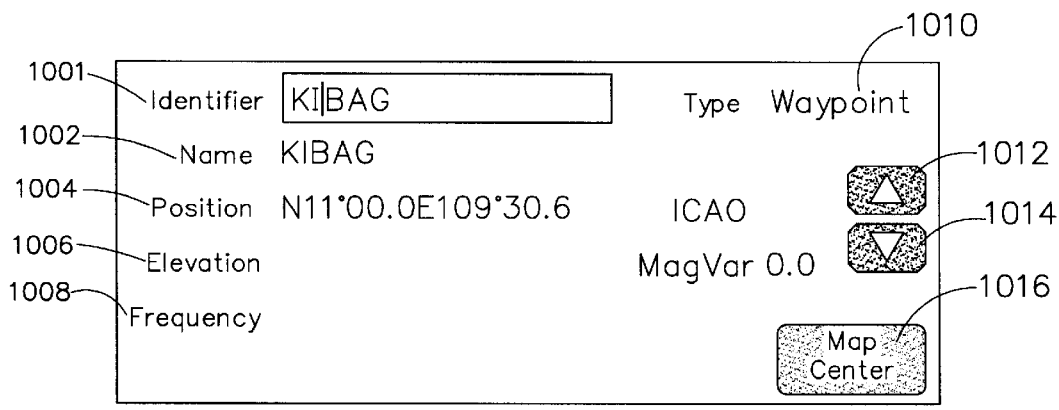
FIG. 10 illustrates an exemplary navigation database in accordance with the present invention.

FIG. 10 shows the browsing feature of the navigation database. The navigation database is programmed with every waypoint, airway, airport, and other navigational aids that are associated with an identifier in the world. The navigation database feature enables the pilot to view various information about the identifier, such as the type of identifier in field 1010 (whether the identifier is a waypoint or an airport); the name 1002 of the identifier; the position 1004 of the identifier; the elevation 1006 of the identifier, for airports and other locations where elevation is relevant; and the frequency 1008 at which the identifier can be contacted.

Preferably, the navigation database has a smart text entry feature similar to that described in the co-pending patent application "Method and System For Entering Data Within A Flight Plan Entry Field," filed on Nov. 17, 2000 as Ser. No. 09/715,308. More specifically, as the pilot enters character into the filed labeled "Identifier," the database is searched and the information for a likely identifier is displayed. For example, when the pilot enters the character "K", the database may automatically select KIBAG for display, as shown in FIG. 10. As the aircraft operator enters additional text identifiers into the Identifier field, computer 1106 continues to compare the entered characters typed against those corresponding sequential text identifiers stored within the database. Based on locating similar text characters, computer 1106 selects the most likely complete text identifier from the database that matches the letters entered and automatically refreshes the complete text identifier displayed in field 1002. This process may otherwise be known as smart text entry or automatic complete text entry into a flight plan entry field.

Computer 1106 may be configured in several manners to determine which identifier is likely to be displayed. For example, the operation may occur completely alphabetically: once the pilot enters a character, the first identifier in the data base with that character is displayed. As more characters are entered, the first identifier matching the series of character is displayed.

In the alternative, computer 1106 may determine, based on the current flight plan or the current position of the aircraft, the most likely identifier. For example, if the flight plan is programmed to fly from Texas to California, information about identifiers in New Jersey are not as likely to be desired. Therefore, in the case where there are more than one identifiers that match the entered characters, computer 1106 would be configured to first display the identifier that match the entered characters and is closes to the current position. This alternative may increase the speed of entry of identifiers. For example, referring again to FIG. 10, if the waypoint KIBAG is in proximity to the current position, the information for waypoint KIBAG may be the first to be displayed as soon as the pilot enters the character K into identifier filed 1001.

FIG. 10 also shows arrows 1012 and 1014. A pilot may use arrows 1012 and 1014 to scroll through the list of identifiers in the database. Such a scroll feature may be configured alphabetically, such that the pilot is scrolling through the identifiers in alphabetical order. In the alternative, such a scrolling function may be configured to scroll through the identifiers in another order, such as by proximity to the current location of the aircraft, or proximity to the current flight path.

Button 1016 is configured such that the activation of button 1016 displays the location of the currently selected identifier on a map display.

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

We claim:

1. An aircraft display within a flight management system containing a computer, where a flight plan can be programmed into the computer, and said aircraft display is coupled to said computer, said aircraft display comprising:

a plurality of rows, wherein each row contains data regarding a procedure within the flight plan; and means for scrolling through the plurality of rows, the means for scrolling configured to selectively change said aircraft display to display a different plurality of rows corresponding to a different portion of the flight plan.

2. The aircraft display of claim 1, wherein the means for scrolling comprises a plurality of scroll arrows located on said aircraft display and wherein the activation of one of said scroll arrows results in a change in said aircraft display.

3. The aircraft display of claim 2 wherein the activation of a scroll arrow causes the display to comprise a different plurality of rows, wherein each row contains data regarding a procedure within the flight plan.

4. The aircraft display of claim 1, wherein the scrolling means comprise a first scroll button and a second scroll button and wherein, said first scroll button is configured to change said aircraft display to display a different plurality of rows corresponding to an earlier portion of the flight plan; and said second scroll button is configured to change said aircraft display to display a different plurality of rows corresponding to a later portion of the flight plan.

5. The aircraft display of claim 1 wherein each of said plurality of rows comprise a plurality of data elements selected from the following data elements: waypoint name, airway name, procedure name, bearing, distance, speed, altitude, estimated time of arrival, estimated remaining fuel at arrival, and weather data regarding the waypoint.

6. The aircraft display of claim 1 wherein additional procedures may be added to the flight plan and wherein, said additional procedures are displayed in a conspicuous manner on said display until said additional procedures are finalized.

7. An aircraft display within a flight management system containing a computer, where a flight plan can be programmed into the computer, and said aircraft display is coupled to said computer, said aircraft display comprising:

a plurality of rows, wherein each row contains data regarding a procedure within the flight plan; and means for scrolling;

wherein the flight plan comprises a plurality of flight phases wherein each flight phase comprises a plurality of legs; and wherein the aircraft display further comprises a plurality of flight phase tabs, wherein activation of one of said tabs causes the first leg of the flight phase selected to be displayed as one of the plurality of rows.

8. An aircraft display within a flight management system containing a computer, where a flight plan can be programmed into the computer, and said aircraft display is coupled to said computer, said aircraft display comprising:

a plurality of rows, wherein each row contains data regarding a procedure within the flight plan; and means for scrolling;

each of said plurality of rows may contain data regarding a procedure comprising a plurality of legs; and wherein the procedure may be expanded such that each leg of the procedure is displayed.

9. The aircraft display of claim 8 wherein:

the display of a leg of a procedure may be collapsed into a data summarizing of the procedure.

10. The aircraft display of claim 8 further comprising:

an indicator situated in proximity to each of said plurality of rows in which the row contains a procedure which comprises a plurality of legs.

11. The aircraft display of claim 10 wherein said indicator may be configured as a toggle such that the activation of said indicator switches the display of said procedure between a summary display of said procedure and a display of each leg of said procedure.

12. A method for accessing information in a navigation database of an aircraft avionics flight management system within an aircraft having a computer means, the computer means communicating with a monitor, at least one data source, and a text entry means, the method comprising:

entering at least one alphanumeric character corresponding to a text identifier into the text entry device and displaying the text entered on an identifier entry field on the display;

selecting a likely text identifier;

displaying, on the monitor, the likely text identifier; and repeating entering, comparing, and displaying steps until a desired text identifier with associated information is displayed on the monitor.

13. The method of claim 12 in which said associated information comprises the name of the identifier.

14. The method of claim 12 in which said associated information comprises the position of the identifier.

15. The method of claim 12 in which said associated information comprises the type of the identifier.

16. The method of claim 12 in which said associated information comprises the frequency of the identifier.

17. The method of claim 12 in which said associated information comprises the elevation of the identifier.

18. The method of claim 12 in which the selecting step comprises:

comparing the entered character to data stored in each data source and identifying text identifiers that matches the entered characters;

if the number of text identifiers that match the entered characters is greater than one, then determining which text identifier is closest to the current physical location of the aircraft, and naming said text identifier as the likely text identifier.

19. The method of claim 18 further comprising:

if the number of text identifiers that match the entered characters is equal to one, then naming said text identifier as the likely text identifier.

20. A method of selecting windows within a flight management system which comprises computing means, a display, and means for accepting user input said method comprising:

organizing data into a first plurality of categories;

displaying a first plurality of tabs on a display, wherein each of said plurality of tabs corresponds to one of said plurality of categories;

receiving an indication of a desire to view information organized under one of said plurality of tabs;

changing the contents of said display such that information related to the selected tab is displayed.

21. The method of claim 20 further comprising:

separating some of said data into a second plurality of categories;

displaying a second plurality of tabs on a display, wherein each of said plurality of tabs corresponds to one of said plurality of categories; and repeating said receiving and changing steps for both said first plurality of tabs and said second plurality of tabs.

22. The method of claim 20 further comprising:

highlighting one of said plurality of tabs in the event that data organized within a category represent by said tab requires attention from a user.

* * * * *